(12) United States Patent
Jainek

(10) Patent No.: US 6,955,755 B2
(45) Date of Patent: Oct. 18, 2005

(54) LIQUID FILTER COMPRISING A VALVE ARRANGED IN A SUPPORT TUBE OF A FILTER ELEMENT

(75) Inventor: Herbert Jainek, Heilbronn (DE)

(73) Assignee: Mann & Hummel GmbH, Ludwigsburg (DE)

( * ) Notice: Subject to any disclaimer, the term of this patent is extended or adjusted under 35 U.S.C. 154(b) by 338 days.

(21) Appl. No.: 10/419,268

(22) Filed: Apr. 21, 2003

(65) Prior Publication Data

US 2004/0016687 A1 Jan. 29, 2004

Related U.S. Application Data

(63) Continuation of application No. PCT/EP01/10964, filed on Sep. 22, 2001.

(30) Foreign Application Priority Data

Oct. 20, 2000 (DE) .......................................... 100 52 101

(51) Int. Cl.⁷ .................... B01D 35/147; F01M 11/03
(52) U.S. Cl. .................. 210/130; 210/430; 210/437; 210/171; 123/196 A; 251/143; 251/368; 137/511

(58) Field of Search ................................ 210/130, 133, 210/437, 440, 430, 171, 168; 123/196 A; 251/143, 369, 368; 137/511

(56) References Cited

U.S. PATENT DOCUMENTS

| | | | |
|---|---|---|---|
| 2,877,902 A | | 3/1959 | Chase et al. |
| 3,473,664 A | * | 10/1969 | Hultgren .................... 210/130 |
| 4,279,746 A | * | 7/1981 | Leutz ......................... 210/130 |
| 5,535,588 A | | 7/1996 | Peterson et al. |

FOREIGN PATENT DOCUMENTS

WO 00/09238 2/2000

OTHER PUBLICATIONS

Search Report.

* cited by examiner

Primary Examiner—Terry K. Cecil
(74) Attorney, Agent, or Firm—Crowell & Moring LLP

(57) ABSTRACT

A liquid filter including a valve arranged in a supporting tube of a filter insert, in which the valve is fixed by a disk (60) which is oversized relative to a mounting opening (61), so that reliable sealing to the edges of the disk is facilitated. Use of the disk (60) simplifies the mounting of the valve.

22 Claims, 2 Drawing Sheets

LIQUID FILTER COMPRISING A VALVE ARRANGED IN A SUPPORT TUBE OF A FILTER ELEMENT

CROSS REFERENCE TO RELATED APPLICATIONS

This application is a continuation of international patent application no. PCT/EP01/10964, filed Sep. 22, 2001, designating the United States of America, and published in German as WO 02/34354, the entire disclosure of which is incorporated herein by reference. Priority is claimed based on Federal Republic of Germany patent application no. DE 100 52 101.0, filed Oct. 20, 2000.

BACKGROUND OF THE INVENTION

The invention relates to a liquid filter, particularly for the oil or fuel of an internal combustion engine, which is constructed in known manner and has a valve in the support tube of the filter insert. The invention further relates to a mounting element suitable to fix the valve inside the support tube. Finally, the invention relates to a method for mounting the valve in the described liquid filter.

Liquid filters of the initially described type are known in the art. For, instance, FIG. 1 of WO 00/09238 shows a liquid filter whose filter insert is provided with a support tube. A valve unit, composed of a valve spring that is supported inside the support tube and a valve body that is held by the spring, is arranged inside the support tube. These components are held in place inside the support tube by a mounting element made of synthetic resin material. The intention is to provide a valve that is easy and cost-effective to mount.

The support tube is preferably also made of synthetic resin material. As a result, the holding forces that can be transmitted when the mounting element is fastened are limited. In addition, a snap connection must be provided that prevents the mounting element from becoming detached. To ensure complete sealing between the unfiltered liquid side and the filtered liquid side of the filter, a seal must furthermore be provided between the mounting element and the support tube. This adds another component and complicates the mounting process and reduces the economic efficiency of the proposed solution.

SUMMARY OF THE INVENTION

The object of the invention is thus to provide a liquid filter with a valve that is particularly cost effective to produce and to install in a mounting location, particularly in a filter insert support tube.

This and other objects are achieved in accordance with the present invention by providing a liquid filter comprising a housing having at least one liquid inlet, a return line, and a filter insert disposed therein, wherein a valve unit is mounted in a mounting location of the housing; said valve unit comprising a valve seat, a valve body, and at least one mounting element for mounting the valve unit in the housing, said mounting element comprising a plate which has greater hardness than a material from which the mounting location in the housing is made and which has a larger diameter than a mounting opening defined by the mounting location.

In accordance with a further aspect of the invention, the objects are achieved by providing a liquid filter comprising a housing having at least one liquid inlet, a return line, a filter insert, a support tube for the filter insert, and a valve arranged in the support tube, wherein the valve is provided with a mounting element for fixing the valve in the support tube, said mounting element comprising plate which has greater hardness than the support tube and a larger diameter than a mounting opening provided for the plate in the support tube.

According to the invention, the mounting element for fixing the valve within the support tube is produced from a plate, especially of spring steel. This plate is harder than the support tube. It also has a larger diameter than a mounting opening provided in the support tube for securing the plate. Once the plate is installed in the support tube, it is pressed into and securely fixed within the support tube by overcoming the difference of the two diameters. On the other hand a reliable seal between the unfiltered liquid side and the filtered liquid side of the filter is ensured. Several functions are thereby integrated in a single component to improve the economic efficiency of the liquid filter, which is a stated object of the invention.

An alternative embodiment of the valve provides that the valve be a module that comprises at least the mounting element and the valve components. This module can be inserted as a unit into the mounting opening at the mounting location. As a result, this functional unit can be used in different applications. It is merely important that the material properties of the mounting location are such that the valve unit is reliably fixed by the mounting element. This is achieved by the fact that the mounting location is less hard than the mounting element, as described. This condition is met in the case of mounting locations that are formed, e.g., by a synthetic resin material housing.

The valve may, in particular, be a bypass valve. If the pressure difference on the filter element, i.e., between the unfiltered liquid side and the filtered liquid side, rises to an unacceptable level, the bypass valve opens to prevent interruption of the liquid circuit in which the filter is installed. Such bypass valves are necessary, for instance, in the oil circuit of an internal combustion engine because the engine must be lubricated irrespective of whether the filter is functioning.

According to a particularly advantageous embodiment of the invention, the valve seat that communicates with the valve body is simultaneously integrated into the mounting element plate. This further enhances functional integration and reduces the number of components and their complexity. It is particularly advantageous if the plate is at least partially coated with an elastomer. The elastomer can improve both the seal between the plate and the mounting opening, i.e., between the unfiltered liquid side and the filtered liquid side, and the seal between the valve body and the valve seat. The coating can be applied to one side or to both sides of the plate.

The additional element of the valve, namely the valve body, is advantageously supported directly against a seating surface of the support tube with the interposition of a compression spring. As an alternative to this direct support, it is also possible to provide a valve body supporting element that snaps into the support tube where the tube receives the compression spring.

A further embodiment of the invention provides that a limit stop be arranged on the support tube for the mounting element. This limit stop may be comprised of ribs or a flange and facilitates manual or automated installation of the mounting element.

To enhance the fixation of the plate at the mounting location, a shoulder can moreover be provided in the mounting opening. This shoulder corresponds with the plate in such a way that the plate is axially fixed in at least one direction. This direction is preferably the removal direction of the plate so as to make removal of the plate impossible. The shoulder is configured in such a way that it has a smaller diameter compared to the outside diameter of the plate in its mounted state. This creates the technical effect of the shoulder.

In accordance with one specific embodiment of the invention, the plate can be a deep-drawn sheet metal part. Such a component is particularly easy to produce from punched blanks. The elastomer coating can be applied either prior to punching or prior to deep drawing. The process of coating flat components is simpler and can therefore further reduce the production costs.

A method for mounting the plate in the liquid filter comprises inserting the plate into the mounting opening provided in the support tube. This fixes the functional components of the valve, which include, for instance, the valve spring and the valve body. The plate is fixed in the mounting opening by means of a deformation of the two parts. Synthetic resin material as well as elastic deformable components can be used. The deformable components are due to the above-described difference in the diameters of the plate and the mounting opening. Since the plate is the harder of the two components it will yield less or not at all in the mounting opening and will therefore be pressed into the softer material of the support tube. This press-in process is enhanced by the above-described shoulder in the mounting opening, so that a particularly reliable joint is created.

The described difference in diameter between the plate and the mounting opening refers to the plate in its mounted state. According to a further embodiment of the method for mounting the plate, the plate, as it is installed in the mounting opening, is also plastically deformed by means of a suitable tool to enlarge the diameter of the plate. This further strengthens the joint between the plate and the support tube, or creates it in the first place. In the latter case, the plate can have a diameter that is smaller than, or equal to that of the mounting opening. As a result it is particularly easy to insert the plate into the mounting opening. A firm joint is produced only when the diameter of the plate is enlarged.

Protection is also claimed for a mounting element that is provided for mounting a component in a liquid filter of the described type. The mounting element is produced, in particular, from a punched sheet metal blank. It is especially advantageous if the punching burr in the shaped and finished mounting element protrudes radially outwardly, so that when the element is mounted in the mounting location the burr will support the press-in process. This fixes the mounting element in a particularly reliable manner. To ensure this, the burr protrudes especially radially outwardly from the edge of the mounting element, so that it will dig into the softer material of the mounting location.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
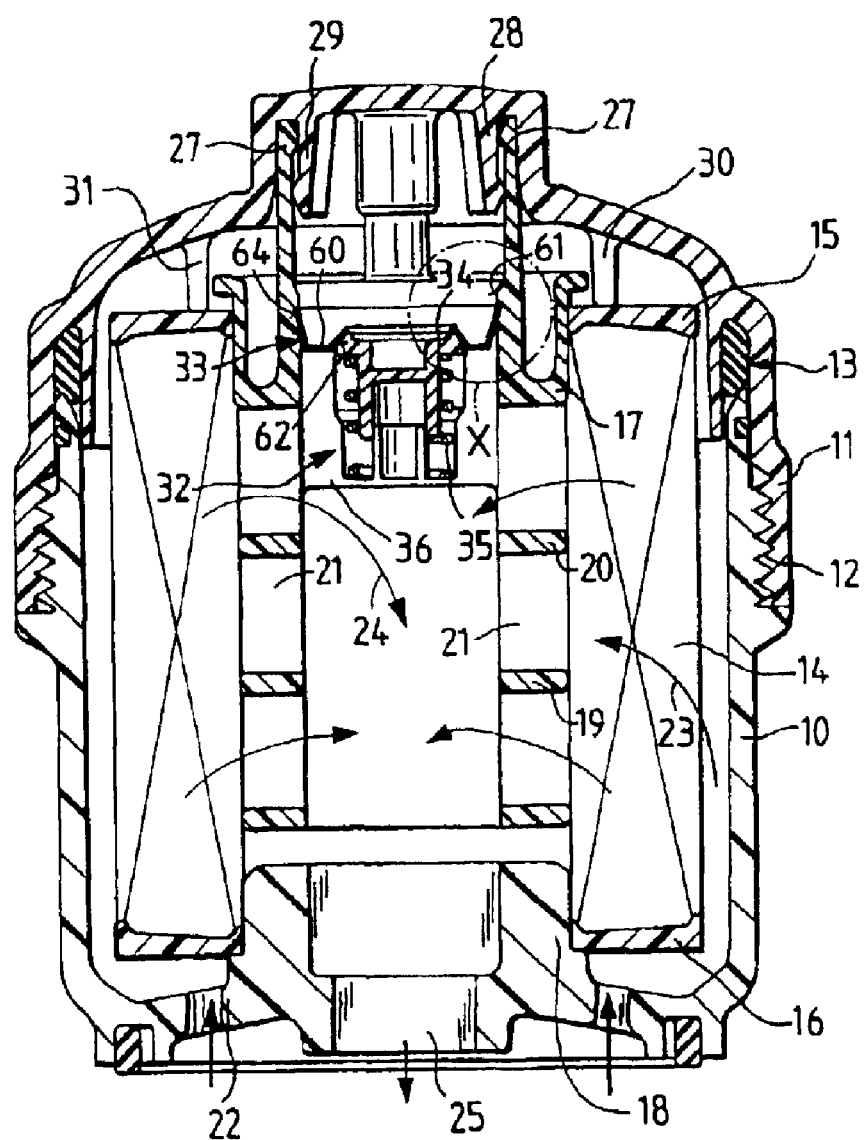
FIG. 1 is a center section through a liquid filter with a bypass valve according to the invention.

The liquid filter according to FIG. 1 comprises a housing 10 that is sealingly closed with a cover 11. The cover is attached to the housing by a threaded connection 12. A sealing system 13 is provided as a seal between cover 11 and housing 10. Inside the housing 10 there is a filter insert 14. The filter insert is made of a zigzag-folded (i.e., pleated) filter paper that is formed into an annular ring and provided with end disks 15, 16 at its axial end faces. The end disks fit against the support tube 17 or the sealing flange 18 so as to provide a seal.

The support tube 17 has support ribs 19, 20 for the filter insert 14. In addition, openings 21 are distributed around the circumference of the support tube to allow the filtered liquid to flow away. The unfiltered liquid enters through the liquid inlet 22, flows through the filter insert 14 in the direction indicated by the arrows 23, 24 and leaves the liquid filter—as described—through the openings 21 of the support tube 17 and the liquid return line 25.

In its upper area, the support tube 17 has locking tabs 27. They engage with locking tabs 28, 29 of the cover and create an essentially permanent connection between the cover and the support tube 17. By applying sufficient pulling forces, it is of course possible to detach the support tube 17 from the cover 11. In a normal replacement of the filter insert 14, when the filter insert 14 is pulled off the support tube, the support tube remains reliably attached to the cover 11. On the cover 11, ribs 30, 31, which function as limit stops, are provided for the filter insert and thus define the axial position of the filter insert.

A bypass valve 32 is arranged inside the support tube 17. The purpose of this valve is to maintain liquid circulation even if the filter insert is very dirty. The bypass valve 32 is composed of a mounting element 33, a valve body 34, a compression spring 35 and a valve body support 36, which is constructed as a part of the support tube. The valve body support 36 forms part of the support tube 17. The mounting element 33 has an outer edge 64 and is inserted into the support tube 17 in a press fit.

The manner of fixing the mounting element which is shown provides a reliable seal. The fixation must merely ensure that the particles retained by the filter insert 14 are retained in this area as well. In other words the leakage rate of this fixation must correspond to the filter fineness of the filter insert 14. The seal is produced by the press or interference fit of the outer edge 64 in a mounting opening 61. The press fit occurs due to an elastic deformation of both the plate 60 forming the mounting element 33 and the mounting opening 61 in the support tube 17.

Furthermore, a valve seat 62, against which the valve body 34 is supported, is integrated into the mounting element 33. These two components thus ensure the function of the bypass valve. The valve body is urged against the valve seat 62 by the compression spring 35.

Figure 2:
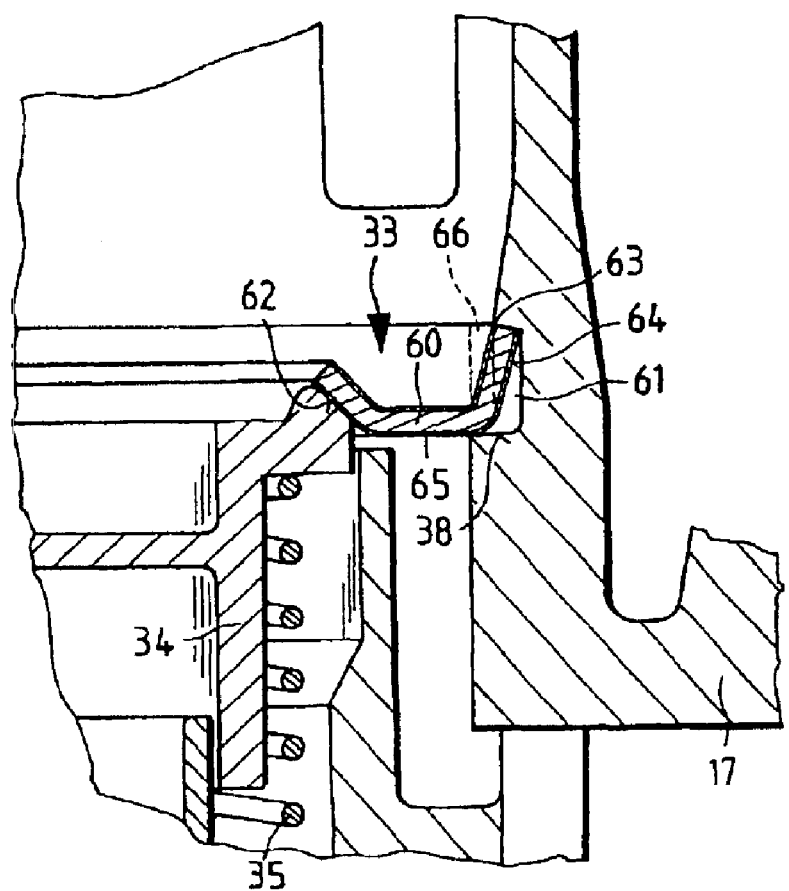
FIG. 2 is a detail view X corresponding to a portion of FIG. 1 in an alternative embodiment of the joint between the mounting element and the support tube.

FIG. 2 shows an alternative embodiment of the mounting element 33 in the mounting opening 61. In other respects, the detail depicted in FIG. 2 corresponds to the variant of the liquid filter shown in FIG. 1. Like components are identified by the same reference numerals.

The disk 60 of the mounting element 33 is completely coated with an elastomer 65 that was applied to the plate after deep drawing. Alternatively, a coating on one side is also feasible. This elastomer improves the sealing action of the valve seat 62 and the sealing between mounting plate and the mounting opening 61. The illustrated embodiment of the plate 60 shows an arrangement in which the valve seat 62 and the seal in the mounting opening 61 are on the same side of the plate. An alternative production of the mounting element, which is to coat the plate-like semi-finished steel product with elastomer on one side, is therefore feasible. When the punched blanks are subsequently shaped, the elastomer yields due to its material properties, so that a mounting element coated on one side with elastomeric material is produced.

The mounting opening 61 is provided with a shoulder 63 to prevent the mounting element from slipping out.

To facilitate installation of the mounting element 33, the element can first be produced with the contour 66 indicated by the broken line in FIG. 2. To install it, the element can be easily brought into the mounting position by sliding it past the shoulder 63. Subsequently, a suitable tool is used to enlarge the outside diameter of the mounting element, so that the outer edge 64 fits against the shoulder 63. In this manner, the mounting element on the one hand is fixed inside the support tube 17 and the elastomer 65 on the other hand produces a reliable seal along the outer edge 64 between the unfiltered liquid side and the filtered liquid side of the filter element.

Limit stops 38 are provided on the support tube 17. They limit or fix the axial position of the mounting element 33 and facilitate its insertion into the support tube 17. The mounting element 33 can be provided with snap elements so that it can be locked onto the support tube 17.

Figure 3:
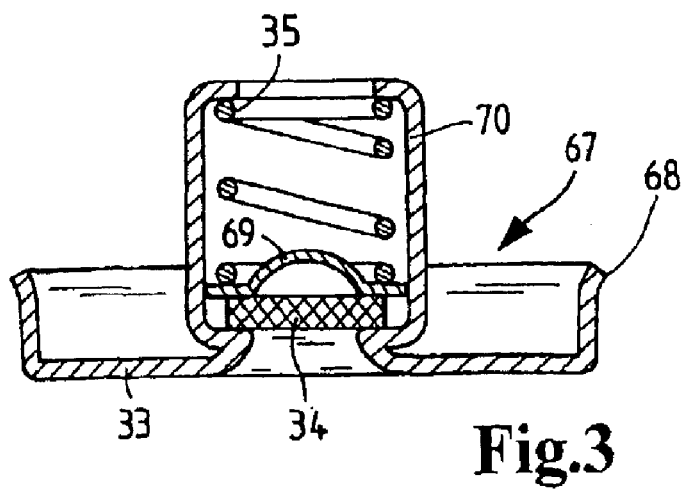
FIG. 3 is a center section through a valve unit with an integrated mounting element.

FIG. 3 shows an embodiment in which the mounting element 33 and the remaining valve components form a valve unit 67. A valve receptacle 70 is integrated in the mounting element to receive the valve body 34, which is provided with a guide plate 69. The compression spring 35, which provides the sealing pressure of the valve, engages the guide plate.

With the aid of punching burrs 68, using the same principle shown in FIG. 1, the valve unit 67 can be inserted into a housing. In this context, the support tube can be understood as the housing component. Direct coupling to the housing is just as feasible, however. An additional seal by means of an elastomer coating is not provided in this embodiment. The punching burr 68 digs so deeply into the mounting location that it is sufficient to provide a reliable seal.

If desired, the valve body can be made of an elastomer, so that the seal of the valve does not need to be provided by an additional elastomer coating of the mounting element 33.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising a housing having at least one liquid inlet, a return line, and a filter insert disposed therein, wherein a valve unit is mounted in a mounting location of the housing; said valve unit comprising a valve seat, a valve body, and at least one mounting element for mounting the valve unit in the housing, said mounting element comprising a plate which has greater hardness than a material from which the mounting location in the housing is made and which has a larger diameter than a mounting opening defined by the mounting location, said plate being pressed into the mounting location material.

2. A liquid filter according to claim 1, wherein said mounting plate is made of steel.

3. A liquid filter according to claim 1, wherein said filter is connected to an oil circuit of an internal combustion engine for filtering lubricating oil of said engine.

4. A liquid filter according to claim 1, wherein the filter is connected to a fuel line of an internal combustion engine for filtering fuel for the engine.

5. A liquid filter according to claim 2, wherein a valve seat is integrated in the plate, and said valve seat is sealed by a valve body when the valve is closed.

6. A liquid filter according to claim 2, wherein the plate is at least partially coated with an elastomer.

7. A liquid filter according to claim 2, wherein the plate is a deep-drawn sheet metal part.

8. A liquid filter comprising a housing having at least one liquid inlet, a return line, a filter insert, a support tube for the filter insert, and a valve arranged in the support tube, wherein the valve is provided with a mounting element for fixing the valve in the support tube, said mounting element comprising a plate which has a greater hardness than a material from which the support tube is made and a larger diameter than a mounting opening provided for the plate in the support tube, said plate being pressed into the support tube material.

9. A liquid filter according to claim 8, wherein said valve is a bypass valve which allows liquid to bypass the filter if the filter becomes clogged.

10. A liquid filter according to claim 8, wherein said support tube is made of synthetic resin material.

11. A liquid filter according to claim 8, wherein said mounting plate is made of steel.

12. A liquid filter according to claim 8, wherein said filter is connected to an oil circuit of an internal combustion engine for filtering lubricating oil of said engine.

13. A liquid filter according to claim 8, wherein the filter is connected to a fuel line of an internal combustion engine for filtering fuel for the engine.

14. A liquid filter according to claim 8, wherein a valve seat is integrated in the plate, and said valve seat is sealed by a valve body when the valve is closed.

15. A liquid filter according to claim 14, wherein the valve body of the valve is supported inside the support tube, and a compression spring is interposed between the valve body and the support tube.

16. A liquid filter according to claim 8, wherein the plate is at least partially coated with an elastomer.

17. A liquid filter according to claim 8, wherein the support tube is provided with an annular flange or with ribs, said flange or ribs serving as a limit stop for the mounting element.

18. A liquid filter according to claim 8, wherein the plate is a deep-drawn sheet metal part.

19. A method of mounting a plate in a liquid filter according to claim 8, said method comprising inserting the plate into the mounting opening provided for the plate in the support tube, whereby functional components of the valve are fixed inside the support tube, and the plate is fixed by deformation of the plate and the mounting opening.

20. A mounting element for a liquid filter for fixing valve inside a support tube of the liquid filter, wherein the mounting element is comprised of a plate that has a greater hardness than a material from which the support tube is made and has larger diameter than a mounting opening provided for the plate in the support tube, said plate being pressed into the support tube material.

21. A mounting element according to claim 20, wherein said plate is a steel plate.

22. A mounting element for a liquid filter according to claim 21, wherein the mounting element is punched out of sheet metal and subsequently shaped in such a way that a punching burr protrudes radially outwardly from a mounting element contact surface for mounting the mounting element in a housing of the liquid filter.

* * * * *